3,110,676
FERRITE FOR MEMORY CORE
Ernst Albers-Schoenberg, Metuchen, N.J., assignor to Indiana General Corporation, Valparaiso, Ind., a corporation of Indiana
No Drawing. Filed Apr. 18, 1961, Ser. No. 103,713
3 Claims. (Cl. 252—62.5)

This invention relates to the production of ferromagnetic ceramic bodies which have hysteresis loops of substantially square or rectangular shape which are especially suited for use as memory cores and to the bodies so produced.

Among the objects of the invention is to provide a ferromagnetic material having hysteresis loops which approach very closely to a square or rectangular shape.

As shown in my U.S. Patent No. 2,715,109, the addition of limited amounts of calcium oxide to ferrite compositions of the MgO—MnO—$Fe_2O_3$ system results in products of excellent loop squareness. If cores made from these mixtures are fired at approximately the same temperature as is generally used for the maturing of the calcia-free bodies of this system (e.g. 2400° F.), low-coercivity materials of relatively long response-time are obtained. On the other hand, there is the possibility of a low-fire treatment of the calcia-containing magnesium-manganese ferrites resulting in a great variety of core types with pronounced rectangularity and switching times between 0.5 and 2.0 microseconds.

An addition of copper oxide to magnesium-manganese ferrites has also been recommended (U.S. Patent No. 2,981,689). Further than that, it has been shown that in high-manganese containing bodies the magnesia component can be replaced completely by copper oxide, so that CuO, MnO and $Fe_2O_3$ appear as the basic constituents of the material (U.S. Patent Nos. 2,818,387 and 2,905,641). Cooling by quenching is necessary to produce loop rectangularity in these bodies.

Among other objects of the invention is to provide a ferrite composition with a square or rectangular hysteresis loop which is capable of being fired at relatively low temperatures, in fast-cooling kilns, and which need not be quenched.

Among other objects of the invention is to provide a ferrite composition capable of being fired at relatively low temperature to produce ferrites with a square or rectangular hysteresis loop.

Among the advantages of providing ferrites which fire at low temperatures are that the ferrites can be fired on a production basis in a small kiln such as a tubular muffle kiln where quick heating to the peak firing temperature, firing under strictly controlled atmospheres and rapid cooling are made possible whereby ferrite bodies of very good and extremely uniform properties both within the batch and from batch to batch are obtained. A small tubular muffle kiln is the most reliable kiln for firing in a protective atmosphere; thus, in such kilns there is no porous kiln lining within the muffle to soak up oxygen or other reactive gas from a preceding atmosphere, there is no leakage, and there is no great amount of heat stored in the kiln which interferes with accurate control of a rapid cooling cycle. Firing at low temperatures also provides a small and uniform crystal structure.

The utility of square or rectangular hysteresis loop ferrites for memory and switching cores is well known and is discussed in the applications and patents described below.

My Patent No. 2,715,109 as well as applications Serial No. 442,534, filed July 12, 1954 (Patent No. 2,981,689), Serial No. 666,456, filed June 18, 1957 (Patent No. 2,981,690), and Serial No. 783,763, filed December 30, 1948, all disclose square loop ferrite bodies which include manganese oxide and magnesia as components. CuO is also disclosed as a required component in Serial No. 783,763 and as an optional component in the other applications. CaO or its equivalent is a required component in Patent No. 2,715,109 and CaO or CuO is a required component in Patent No. 2,981,690.

This invention is based on the discovery that ferrite bodies with square or rectangular hysteresis loop properties, with fast switching times and with uniform, reproducible properties may be obtained by providing a ferrite composition of at most, 50 mol percent $Fe_2O_3$ which consists essentially of MnO, CuO, CaO and $Fe_2O_3$, molding the composition to the shape of the body desired, and firing the body at a relatively low temperature.

The range of the various components of the ferrite composition are as follows:

| | Mol percent broad | Mol percent preferred |
|---|---|---|
| $Fe_2O_3$ | 28–50 | 31–36. |
| CuO | 2–10 | 4–8. |
| CaO | 2.5–7.5 | 3–6. |
| MnO | Remainder | Remainder. |

The compositions listed under the preferred range have generally shorter switching times and steeper pulse responses (other things being equal such as firing temperatures).

The firing temperature required to produce ferrite bodies of the desired short switching times (with a $T_a$ of below 1 microsecond, for example) is between about 1900° F. and 2250° F. (about 1040°–1230° C.). It will be realized that broad firing ranges for ferrites have been disclosed which may include these low temperatures. Except for the case of ferrites which contain substantial amounts of CdO, which require firing at relatively low temperatures if excessive losses of CdO due to its volatility are to be avoided, it is not the practice and generally is not even considered practical to fire ferrites, and especially not the square loop ferrites, in the lower fringe regions of the broad temperature ranges disclosed.

In the firing process, the bodies are maintained for from twenty minutes to about two hours at the peak firing temperature. With the relatively small batch type of muffle kiln (preferably tubular kiln), the cooling may be conducted fairly rapidly under strictly controlled conditions. The cooling is conducted in a neutral atmosphere such as $N_2$. The firing may be carried out in the presence of air but it is essential that the cooling be conducted in a neutral or non-oxidizing atmosphere. In changing from air to nitrogen as the atmosphere, the muffle kiln provides for a rapid uniform change of atmospheres since the tube contains no porous refractory materials which soak up the previous atmosphere. In small muffle kilns, the first 400°

F. of cooling from the peak temperature may be reproducibly conducted in about 15 minutes (this 400° F. being the most critical part of the cooling cycle).

The following examples further illustrate the operation of the invention.

EXAMPLE 1

A ferrite composition was made up by mixing and grinding the following ingredients:

|  | Wt. percent | Oxide equiv. in mol percent |
|---|---|---|
| Basic copper carbonate | | |
| $CuCO_3 \cdot Cu(OH)_2 \cdot H_2O$ | 7.82 | 8.00 |
| $CaCO_3$ | 4.26 | 5.00 |
| $MnO_2$ | 36.26 | [1] 49.00 |
| $Fe_2O_3$ | 51.66 | 38.00 |
|  | 100.00 | 100.00 |

[1] As MnO.

After wet-milling, the body was calcined at 1650° F. The calcine was remilled (wet) and spray-dried. Toroidal cores were pressed from the granulated powder. One portion was fired at 2030° F., the other at 2160° F., both for one hour. During firing the atmosphere was air except that, in each instance, approximately at the end of the firing period or as far as down to 100° F. below the peak temperature, the atmosphere was changed to $N_2$ and maintained with this atmosphere until cooled. The first 400° F. of cooling was carried out in twenty minutes.

The properties of the product are listed in the Table I below.

EXAMPLE 2

The process was conducted as in Example 1 except that the composition below was employed and the temperature of firing was 2030° F.

|  | Wt. percent | Oxide equiv. in mol percent |
|---|---|---|
| $CuCO_3 \cdot Cu(OH)_2 H_2O$ | 5.22 | 5 |
| $CaCO_3$ | 4.55 | 5 |
| $Mn_2O_3$ | 39.46 | [1] 55 |
| $Fe_2O_3$ | 50.77 | 35 |

[1] As MnO.

The properties are listed in Table I below.

EXAMPLE 3

The process was conducted as in Example 1 except that the composition below was employed and the temperature of firing was 2030°.

|  | Wt. percent | Oxide equiv. in mol percent |
|---|---|---|
| Basic copper carbonate | 6.53 | 6.0 |
| $CaCO_3$ | 3.80 | 4.0 |
| $Mn_2O_3$ | 42.71 | 58.5 |
| $Fe_2O_3$ | 46.96 | 31.5 |

The properties are recorded in Table I below.

In Table I, the values of the driving current (ma.), "undisturbed one response voltage" ($uV_1$), "disturbed zero response voltage" ($dV_z$), "core peaking time" ($T_p$) and "core switching time" ($T_s$) are given. Exact definitions for these properties are found in the MPI Standard's publication No. 29–59, published by the Ferrite Manufacturers Association, Metal Powder Industries Federation, 60 East 42nd Street, New York City 17, New York.

Table I

| Example | Firing Temp., ° F. | Drive Current (m.a.) | $uV_1$ | $dV_z$ | $T_p$, microsec. | $T_s$, microsec. |
|---|---|---|---|---|---|---|
| 1 | 2,030 | 570 | 110 | 16 | 0.4–0.5 | 0.8–0.9 |
| 1a | 2,160 | 450 | 64 | 12 | 0.5–0.6 | 1.0–1.1 |
| 2 | 2,030 | 500 | 70 | 11 | ~0.5 | ~1.05 |
| 3 | 2,030 | 570 | 80–90 | 8–9 | ~0.5 | ~1.0 |

As already stated, the ability to fire at low temperatures provides for better regulation of the firing conditions which in turn results in greater uniformity of core properties.

The features and principles underlying the invention described above in connection with specific exemplifications will suggest to those skilled in the art many other modifications thereof. It is accordingly desired that the appended claims shall not be limited to any specific feature or details thereof.

I claim:

1. A ferromagnetic ferrite body made by firing a mixture of manganese, copper, calcium and ferric oxides in the temperature range of 1900°–2250° F. and then rapidly cooling in a neutral atmosphere, said body having a substantially rectangular hysteresis loop and a fast response time, said body consisting essentially of 28–50 mol percent of ferric oxide, 2–10 mol percent of copper oxide, 2.5–7.5 mol percent of calcium oxide and the remainder being manganese oxide.

2. A ferromagnetic ferrite body made by firing a mixture of manganese, copper, calcium and ferric oxides in the temperature range of 1900°–2250° F. and then rapidly cooling in a neutral atmosphere, said body having a substantially rectangular hysteresis loop and a fast response time and consisting essentially of about 31–36 mol percent of ferric oxide, 4–8 mol percent of copper oxide, 3–6 mol percent of calcium oxide, the remainder being manganese oxide.

3. In a process of making a square loop ferrite with a fast response time, the steps comprising
providing a composition consisting essentially of 28–50 mol percent of ferric oxide
2–10 mol percent of copper oxide
2.5–7.5 mol percent of calcium oxide
remainder manganese oxide molding said composition to shape,
firing said body at a peak firing temperature between 1900°–2250° F. for ⅓ to 2 hours in an atmosphere of air,
rapidly cooling said body and changing the atmosphere to a neutral atmosphere before the products have cooled to 100° F. below the peak firing temperature.

References Cited in the file of this patent

UNITED STATES PATENTS

| 2,715,109 | Albers-Schoenberg | Aug. 9, 1955 |
| 2,818,387 | Beck et al. | Dec. 31, 1957 |
| 2,950,251 | Weisz | Aug. 23, 1960 |
| 2,962,445 | Pierrot et al. | Nov. 29, 1960 |